United States Patent [19]

Müller et al.

[11] 4,150,211
[45] Apr. 17, 1979

[54] PULVERULENT COATING SUBSTANCE

[75] Inventors: Hanns P. Müller; Kuno Wagner, both of Leverkusen; Hans J. Kreuder, Krefeld, all of Fed. Rep. of Germany

[73] Assignee: Bayer Aktiengesellschaft, Leverkusen, Fed. Rep. of Germany

[21] Appl. No.: 878,365

[22] Filed: Feb. 16, 1978

[30] Foreign Application Priority Data

Feb. 23, 1977 [DE] Fed. Rep. of Germany ....... 2707656

[51] Int. Cl.$^2$ ...................... C08G 18/80; C08G 18/77; C08G 18/08

[52] U.S. Cl. ................................ 528/45; 260/18 TN; 260/858; 260/859 R; 260/859 PV; 427/27; 427/185; 427/195; 528/51; 528/53; 528/58; 528/73

[58] Field of Search ............. 260/77.5 TB; 528/45, 73

[56] References Cited

U.S. PATENT DOCUMENTS

| 3,770,703 | 11/1973 | Gruber et al. | 260/77.5 TB |
|---|---|---|---|
| 3,819,586 | 6/1974 | Rudolph et al. | 260/77.5 TB |
| 3,822,240 | 7/1974 | Schmitt et al. | 260/77.5 TB |
| 4,055,550 | 10/1977 | Panandiker et al. | 260/77.5 TB |

Primary Examiner—H. S. Cockeram
Attorney, Agent, or Firm—Gene Harsh; Lawrence S. Pope

[57] ABSTRACT

The present invention relates to mixtures which are suitable for use as lacquer powders or as binders for lacquer powders and which are solid and capable of being pulverized at temperatures below about 40° C. and liquid at temperatures above about 150° C., which mixtures comprise (a) an isocyanate component having masked isocyanate groups;
(b) a polyhydroxyl component; and, optionally
(c) the conventional auxiliary agents and additives;

characterized in that the substance used as component (a) is a polyisocyanate having isocyanurate groups and isocyanate groups which are masked with lactams. The present invention also relates to the use of these mixtures as lacquer powders or as binders for lacquer powders for coating any heat-resistant substrate by the conventional coating methods employed for lacquer powders.

15 Claims, No Drawings

PULVERULENT COATING SUBSTANCE

FIELD OF THE INVENTION

This invention relates to a new mixture suitable for use as a lacquer powder or as a binder for lacquer powders and to the use thereof.

BACKGROUND OF THE INVENTION

Two-component lacquer powders based on masked isocyanates and hydroxyl group-containing polymers having softening points of at least about 40° C. are known in the art. ε-caprolactam-masked adducts of polyhydric alcohols and polyisocyanates mixed with hydroxyl group-containing polymers are also known (U.S. Pat. No. 3,893,978 corresponding to German Offenlegungsschrift No. 2,215,080).

It has now surprisingly been found that polyisocyanates which have isocyanurate groups and in which the free isocyanate groups are masked with lactam may be used as mixtures with a polyhydroxyl component and optionally the conventional auxiliary agents and additives to serve as new two-component polyurethane lacquer powders which are resistant to yellowing.

Two-component polyurethane lacquer powders based on a mixture of polyisocyanates which have isocyanurate groups and masked isocyanate groups and a polyhydroxyl compound have not hitherto been known.

These new two-component lacquer powders are particularly distinguished from all previously known polyurethane lacquer powders by the following features:

(1) Polyurethane coatings which are resistant to yellowing may even be produced from aromatic diisocyanates which tend to undergo yellowing, and they are also distinguished by advantageous mechanical properties, chemical resistance, good adherence, gloss and good resistance to weathering thereof;

(2) Cross-linking with the polyhydroxyl component at an isocyanate/OH ratio of only about 0.5:1 is sufficient to give rise to excellent polyurethane coatings.

Both the possibility of using aromatic diisocyanates for preparing the products according to the present invention, and the possibility of obtaining optimum film properties with the above-mentioned "sub-cross-linking" clearly show that the present invention provides an exceptionally economical process for coating any substrates.

SUMMARY OF THE INVENTION

The present invention, thus, relates to mixtures which are suitable for use as lacquer powders or as binders for lacquer powders and which are solid and capable of being pulverized at temperatures below about 40° C. and are liquid at temperatures above about 150° C., which mixtures comprise:

(a) an isocyanate component having masked isocyanate groups;

(b) a polyhydroxyl component; and, optionally, (c) the conventional auxiliary agents and additives; characterized in that the substance used as component (a) is a polyisocyanate having isocyanurate groups and isocyanate groups which are masked with lactams.

The present invention also relates to the use of these mixtures as lacquer powders or as binders for lacquer powders for coating any heat-resistant substrate by the conventional coating methods employed for lacquer powders.

DETAILED DESCRIPTION OF THE INVENTION

The isocyanates used for preparing the polyisocyanates which contain isocyanurate groups may be any of the conventional aliphatic, cycloaliphatic, araliphatic and aromatic polyisocyanates and mixtures thereof, e.g., tolylene-2,4- and/or -2,6-diisocyanate; diphenylmethane -2,4'- or -4,4'-diisocyanate, hexamethylene diisocyanate, 1-isocyanatomethyl-3,3,5-trimethyl-5-isocyanatomethyl-cyclohexane (isophorone diisocyanate=IPDI), m- and p-xylylene diisocyanate and cyclohexane-1,3- or 1,4-diisocyanate.

To prepare the corresponding polyisocyanates having isocyanurate groups, the polyisocyanates or mixtures of polyisocyanates exemplified above are heated to from about 60° to 150° C., preferably from about 80° to 110° C., in a known manner and the trimerization catalyst is added at this temperature under a nitrogen atmosphere.

In principle, any trimerization catalysts may be used, provided they enable the polymerization reaction, which is frequently exothermic, to stop when the mixture has reached a certain isocyanate content. Examples of such catalysts include: 2,4,6-tris-dimethylamino phenol, Mannich bases and alkali metal salts of acetic acid. Trialkyl phosphines, for example, are particularly suitable since they may be completely inactivated by the addition of alkylating agents or sulphur when a certain isocyanate content has been reached in the mixture. Although trialkyl phosphines are also known to act as dimerization catalysts, the products obtained are free from isocyanate dimers due to the particular temperatures employed. The trimerization reaction is generally stopped by inactivation of the catalyst when the mixture has a free isocyanate content of from about 20 to 40%, preferably from about 25 to 35% by weight.

The solvent-free polyisocyanate melt containing isocyanurate groups is reacted portionwise with the stoichiometric quantity of masking agent at temperatures of from about 100° to 200° C., preferably from about 120° to 160° C., without any preliminary treatment. The addition proceeds exothermally. By the time the exothermic reaction has died down, conversion is almost quantitative. When the reactants are used in stoichiometric quantities, the conversion rate of the addition reaction may be increased to about 99.5% by the addition of catalysts. It is preferred to use catalysts which, as in the formulation of the lacquer binder, also catalyze the de-blocking and cross-linking reaction with the polyhydroxyl compounds.

It is also possible but less preferred to prepare the component (a) by carrying out the trimerisation reaction and the blocking reaction simultaneously as exemplified i.e. in example 5. It would also be possible to prepare the component (a) i.e. by first blocking one isocyanate group of an organic diisocyanate such as 2,4-diisocyanatotoluene and subsequently trimerizing the remaining free isocyanate group.

Organometallic compounds are, therefore, particularly suitable catalysts, especially organo tin compounds. The organo tin compounds used are preferably tin (II) salts of carboxylic acids, such as tin (II) acetate, tin (II) octoate, tin (II) ethylhexoate and tin (II) laurate, and the tin (IV) compounds, such as dibutyl tin oxide, dibutyl tin dichloride, dibutyl tin diacetate, dibutyl tin dilaurate, dibutyl tin maleate or dioctyl tin diacetate. The catalysts mentioned above may, of course, be used as mixtures.

Other examples of suitable catalysts and details concerning the action of these catalysts may be found in Kunststoff-Handbuch, Volume VII, published by Vieweg und Hochtlen, Carl-Hanser-Verlag Munich 1966, e.g., on pages 96 to 102.

The masking agents used for preparing the masked isocyanic acid esters in the process according to the present invention may be lactams corresponding to the following general formula:

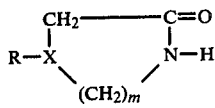

wherein
X represents a CH group, in which case
  R represents hydrogen and
  m represents an integer of from 0 to 9, preferably from 1 to 4; or
X represents a nitrogen atom, in which case
  R represents a straight- or branched-chain $C_1$–$C_4$-alkyl group and
  m represents 3.

Suitable examples of such lactams include, in particular, lactams of ω-aminocarboxylic acids, such as 3-aminopropionic acid, 4-aminobutyric acid, 5-aminovaleric acid, 6-aminocaproic acid and 10-aminocapric acid; N-substituted azalactams, such as 1-N-methyl-hexahydro-1,4,-diazepinone-(3), 1-N-butyl-hexahydro-1,4-diazepinone-(3), 1-N-benzyl-hexahydro-1,4-diazepinone-(3), 1-N-α-pyridyl-hexahydro-1,4-diazepinone-(3), etc. The preferred lactams are butyrolactam, valerolactam, 1-N-methyl hexahydro-1,4-diazepinone-(3) and, especially, ε-caprolactam.

The lactam-masked polyisocyanates having isocyanurate groups used as components (a) in the mixtures according to the present invention are solid at room temperature having a melting point above about 40° C. They generally contain from about 10 to about 20, preferably from about 14 to about 18% by weight of blocked isocyanate groups calculated as —NCO (molecular weight 42).

Component (b) in the mixtures according to the present invention is any organic polyhydroxyl compound having at least two aliphatically bound hydroxyl groups. The polyhydroxyl compound is solid at temperatures below about 40° C. and preferably liquid above about 150° C., but this last-mentioned condition is not essential for the suitability of the polyhydroxyl compound, provided the mixture of components (a) and (b) is a solid substance which is easily pulverized at temperatures below about 40° C. and a liquid which spreads out to form lacquer films at temperatures above about 150° C. This condition could also be fulfilled by using polyhydroxyl compounds having melting points above about 150° C. and/or masked polyisocyanates since mixing components (a) and (b) lowers the melting points of the individual components. It may be assumed that the melting point of mixture (a) and (b) is always below the melting point of the higher melting individual component.

The polyhydroxyl compounds used in accordance with the present invention as component (b) generally contain from about 0.5 to about 12, preferably from about 0,8 to about 5% by weight of hydroxyl groups. Suitable polyhydroxyl compounds are the well-known polyhydroxy acrylates which can be prepared in known manner by co-polymerizing unsaturated monomers such as styrene, butadiene and/or acrylonitrile with unsaturated monomers containing hydroxyl groups such as acrylic acid or methacrylic acid hydroxyethyl or hydroxypropyl esters; polyhydroxy polycarbonates such as those obtained by condensing hexamethylene glycol with phosgene or diphenyl carbonate, epoxy resins such as those prepared by reacting epichlorohydrine with bisphenol A. The preferred polyhydroxyl compounds are, however, the well-known polyester polyols.

Suitable polyesters having hydroxyl groups are, for example, the reaction products of polyhydric, preferably dihydric, alcohols, optionally with the addition of trihydric and higher hydric alcohols, and polybasic, preferably dibasic, carboxylic acids, the corresponding carboxylic acid anhydrides and/or the corresponding carboxylic acid esters with lower alcohols, such as methanol, ethanol, butanol or ethylene glycol; in the last-mentioned case, the corresponding bis-hydroxyalkyl esters of the dicarboxylic acids are used for preparing the polyesters. Mixtures of such acids or acid derivatives may, of course, also be used for preparing suitable polyesters for the purposes of the present invention.

The polybasic carboxylic acids (or the above-mentioned derivatives thereof) may be aliphatic, cycloaliphatic, aromatic and/or heterocyclic and they may be substituted, for example by halogen atoms, and/or may be unsaturated.

The following are mentioned as examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally mixed with monomeric fatty acids, dimethyl terephthalate and terephthalic acid-bis-glycol esters. The following acids or derivatives thereof which are exemplified above are among the preferred starting components for the polyesters used according to the present invention: terephthalic acid, phthalic acid, isophthalic acid, tetrahydrophthalic acid and hexahydrophthalic acid.

The following are examples of polyhydric alcohols which may be used for preparing alcohols suitable for the process according to the present invention: ethylene glycol, propylene glycol-(1,2) and -(1,3), butylene glycol-(1,4) and -(2,3), hexane-(1,6)-diol, octane-(1,8)-diol, neopentyl glycol, cyclohexane dimethanol (1,4-bis-hydroxymethylcyclohexane), 2-methyl propane-1,3-diol, glycerol, trimethylolpropane, hexane-(1,2,6)-triol, butane-(1,2,4)-triol, trimethylol ethane, pentaerythritol, quinitol, mannitol and sorbitol, methyl glycoside, diethylene glycol, triethylene glycol, tetraethylene glycol, polyethylene glycols, dipropylene glycol, polypropylene glycols, dibutylene glycol and polybutylene glycols. The polyesters may also contain carboxyl end groups. Polyesters of lactones, such as ε-caprolactone, or hydroxycarboxylic acids, such as ω-hydroxycaproic acid, may also be used.

The quantity of polyol used for preparing the polyesters is calculated to provide more than one hydroxyl group equivalent to one carboxyl group equivalent.

The polyesters having hydroxyl groups may be prepared in the conventional manner. The two methods described below are particularly suitable.

The first method starts with an acid which is free from mineral acids and may also have been purified by recrystallization.

The ratio of equivalents of acids to alcohol employed depends, of course, on the desired size of the molecule and the OH number. After the addition of from about 0.005 to 0.5%, by weight, preferably from about 0.05 to 0.2%, by weight, of a catalyst, e.g. a tin compound, such as di-n-butyl tin oxide, di-n-butyl tin diester or the like or titanium ester, in particular tetraisopropyl titanate, the reactants are heated in a suitable apparatus through which an inert gas, such as nitrogen is passed. Water begins to be split off at about 180° C. and is removed from the reaction mixture by distillation. The reaction temperature is raised to about 240° C. in the course of several hours. The reaction medium remains completely non-homogeneous until shortly before esterification has been completed. The reaction is terminated after about 24 hours.

The second method starts with the dimethyl ester of a dicarboxylic acid and this ester is transesterified with the desired alcohol component under a stream of an inert gas, such as nitrogen. A titanium ester, a dialkyl tin ester or di-n-butyl tin oxide may again be used as a transesterification catalyst in amounts of from about 0.005 to 0.5% by weight. Methanol begins to be split off at a temperature of about 120° C. The temperature is raised to from about 220° to 230° C. within several hours. Transesterification is completed after from about 2 to 24 hours, depending on the reaction mixture employed.

The melting characteristics which are essential for the present invention may easily be adjusted in the polyhydroxy polyesters used according to the present invention by controlling the degree of branching or degree of condensation during preparation of the polyesters, since the melting point of the polyesters generally rises with increasing degree of branching (which may be achieved by the addition of higher functional starting components) and with increasing degree of condensation.

The mixtures according to the present invention contain components (a) and (b) in quantities corresponding to an equivalent ratio of masked isocyanate groups to hydroxyl groups of from about 0.4:1 to 2:1, preferably from about 0.5:1 to 1.2:1.

To prevent the pulverulent coating substances from sticking together if left in storage for some time, they may be treated with a suitable powder. This powder must be chemically inert towards the components of the coating compound. Talcum, for example or finely divided silicates which may also contain organic groups, such as the silicates obtained by hydrolysis of methyl trichlorosilane, are suitable for this purpose. Finely dispersed calcium phosphate and aluminum sulphate which may be obtained from the decomposition of higher aluminum alcoholates are also suitable.

Levelling agents and gloss improvers may be added, for example, polyvinyl butyrals, copolymers of n-butyl acrylate and 2-ethylhexyl acrylate, ketone-aldehyde condensation resins, solid silicone resins and mixtures of zinc soaps, fatty acid and aromatic carboxylic acids.

Commercially available sterically-hindered polyfunctional phenols, including high molecular weight phenols of this type, have proved to be suitable for use as heat stabilizers and anti-oxidants.

Known pigments may, of course, also be added to the mixtures according to the present invention. The nature and quantity of any additives used depends in each case on the desired properties of the product and may easily be determined by reliable preliminary tests which are not part of the present invention.

To prepare the mixtures according to the present invention, components (a) and (b) and any additives, if used, are vigorously mixed together, preferably using an extruder or a heatable kneader or some other powerful mixing device, e.g. a double-Z kneader. The individual components are preferably mixed in the molten state at a temperature too low for cross-linking. From about 100° to 150° C. is a suitable range within which the mixtures according to the present invention are generally already liquid.

When the mixtures according to the present invention have been homogenized, they are cooled and the solid substance thereby obtained is milled in a commercial mill to be reduced to particles within a maximum range of from about 0.01 to 0.05 mm, and, if necessary, particles larger than about 0.09 mm are removed in a screening machine.

When the mixtures according to the present invention are used according to the present invention for coating substrates, they may be applied by the whirl sintering process, the electrostatic powder coating process or the electrostatic fluidized bed process. The coated substrates are then heated in a stoving oven in which they are exposed to temperatures at which the solid lacquer powder particles melt, coalesce to form a homogeneous film and finally undergo cross-linking with elimination of the masking agent. This means that the coated substrates are generally exposed to temperatures of from about 140° to 280° C., preferably from about 150° to 200° C. The isocyanate groups liberated under these conditions react with the hydroxyl groups of the polyester to form high quality polyurethane films.

This use of the products according to the present invention is suitable for producing high quality, impact-resistant, weathering- and solvent-resistant coatings on any heat-resistant substrates, such as metals, glass, ceramics and, if desired, also wood.

The lacquer films obtainable according to the present invention are distinguished by excellent heat-resistance and light-resistance.

The invention is further illustrated, but is not intended to be limited by the following examples in which all parts and percentages are by weight unless otherwise specified.

EXAMPLES

Example 1

(Preparation of a masked isocyanate to be used according to the present invention)

336 g (2 mol) of hexamethylene diisocyanate, 444 g (2 mol) of isophorone diisocyanate and 348 g (2 mol) of tolylene-2,4-diisocyanate are mixed at room temperature under a nitrogen atmosphere. The mixture is then heated to 60° C. and 2.86 ml of tri-n-butylphosphine are added. The clear solution is then stirred at from 60° to 70° C. for from 20 to 30 minutes. The isocyanate content of the mixture is then determined and found to be 28.9%

NCO. 3.2 g of benzoyl chloride are then added to the mixture and the temperature is raised to 100° C. Another sample is now removed to determine the isocyanate number again. The homogeneous mixture has an isocyanate content of 29%. 884 g of ε-caprolactam are then added portionwise to the reaction mixture within 30 minutes at a temperature of from 110° to 150° C. After all the ε-caprolactam has been added, the reaction mixture is stirred for 20 minutes at from 145° to 150° C. under nitrogen. The molten reaction product is poured out and solidifies to a vitreous resin, m.p. from 80° to 93° C. The resin contains 16.3 wt. % of masked isocyanates and 0.58 wt. % of free isocyanates.

Example 2

(Preparation of a masked isocyanate to be used according to the present invention)

365 g (2.1 mol) of tolylene 2,4-diisocyanate are heated to 80° C. under nitrogen. 1 ml of tributyl phosphine is added to the reaction mixture with stirring under a nitrogen atmosphere and the mixture is stirred for a further period of from 80 to 90 minutes at from 80° to 100° C. 0.13 g of sulphur is then added and the whole mixture is heated for another 5 minutes at 110° C. The isocyanate content of the isocyanate mixtures is then determined. It is found to be 35.8%. 352 g of ε-caprolactam are then added portionwise to the reaction mixture. The reaction is slightly exothermic. The viscosity of the mixture continuously rises during the addition of caprolactam. The reaction temperature is slowly raised from 110° C. to 160° C. When addition of the caprolactam has been completed, 21.6 g of tin octoate are added to the reaction mixture. The molten product is then poured out. It solidifies to a springy, hard, non-tacky resin, m.p. from 95° to 110° C. The resin contains 17.7 wt. % of masked isocyanates and 1.85 wt. % of free isocyanates.

Example 3

(Preparation of a masked isocyanate to be used according to the present invention)

233.1 g (1.05 mol) of isophorone diisocyanate are mixed with 1.5 ml of tributyl phosphine and heated to a temperature of from 70° to 90° C. under nitrogen. 365.4 g (2.1 mol) of tolylene-2,4-diisocyanate are then introduced dropwise into the mixture within 20 minutes. The mixture is stirred for from 90 to 100 minutes under nitrogen at from 80° to 90° C. The isocyanate content of the mixture is then determined and found to be 28.2% NCO.

0.18 g of sulphur are then added to the mixture, followed by portionwise addition of 454 g ε-caprolactam. The reaction temperature is slowly raised to 155° C. during this addition. When all the caprolactam has been added, 33 g of tin-2-ethyl-hexoate are added to the reaction mixture. The molten product is poured out. It solidifies to a vitreous resin, m.p. from 107° to 140° C. The resin contains 16 wt. % of masked isocyanate and 0.25 wt. % of free isocyanate.

Example 4

(Preparation of a masked isocyanate to be used according to the present invention)

487.2 g (2.8 mol) of a mixture of 80% of tolylene-2,4-diisocyanate and 20% of tolylene-2,6-diisocyanate and 235 g (1.4 mol) of hexamethylene diisocyanate are heated to a temperature of from 80° to 90° C. under nitrogen.

2 ml of tri-n-butyl phosphine are then added dropwise and the mixture is heated to from 100° to 110° C. for 30 minutes. 2.39 g of benzoyl chloride are then added, the mixtures stirred for a further 10 minutes at 110° C. and the isocyanate content is then determined. It is found to be 30.9% NCO. 601 g of ε-caprolactam are then added portionwise to the mixture, followed by 39.8 g of tin-(II) octoate. The mixture is stirred for 10 minutes at from 130° to 140° C. after addition of the tin octoate has been completed. The melt is then poured out. A clear, springy, hard resin melting at from 70° to 80° C. is obtained on cooling. The resin contains 16.4 wt. % of masked isocyanate and 0.63 wt. % of free isocyanate.

Example 5

(Preparation of a masked isocyanate to be used according to the present invention)

352 g of ε-caprolactam and 1 ml of tri-n-butyl phosphine are melted under nitrogen (100° C.). Dropwise addition of 365 g of tolylene-2,4-diisocyanate is then begun at this temperature. The reaction temperature rises to 140° C. in the course of this addition of isocyanate. The mixture is stirred for a further 60 minutes at from 140° to 150° C. after all the isocyanate has been added. The isocyanate content is then determined and found to be 6.05% NCO. 1 ml of tri-n-butyl phosphine is again added to the mixture which is then stirred for a further 4 hours at 150° C. under nitrogen. 0.28 g of sulphur are then added and the whole mixture is stirred for further 30 minutes under nitrogen. The melt is then poured out. A clear, brittle resin melting at from 70° to 110° C. is obtained on cooling. The resin contains 17% of masked isocyanate and 2% of free isocyanate.

Example 6

(A) Preparation of a mixture according to the present invention

The necessary components, 48.6 g of a branched terephthalate polyester obtained from terephthalic acid, neopentyl glycol, hexane diol and trimethylol propane (1.5% OH) and 11.3 g of cross-linking agent from Example 3 are first mixed with 40.1 g of finely divided titanium dioxide used as pigment. A commercial copolymer of butyl acrylate and 2-ethylhexyl acrylate is used as levelling agent (from 1 to 2%, based on the binder). The levelling agent is incorporated in the form of a so-called "master batch", i.e. 100 parts of the polyester and 10 parts of the levelling agent are melted together and size reduced after solidification.

The mixture according to the present invention is homogenized in a commercial two-shaft self-cleaning extruder. The temperature of the jacket is adjusted so that the outlet temperature of the melt is approximately 125° C. The cake of melt may either be left to stand or, as is customary in practice, it may be rapidly cooled in a continuously operating squeezing and cooling device. When it has cooled to temperatures of from 20° to 30° C., it is first coarsely milled and then fine milled while cooled with blowers. The finely divided powder obtained is then freed from coarser particles larger than about 0.09 mm either by wind sifting or by mechanical screening.

(B) Application of the mixture obtained according to (A)

Using the mixture according to the present invention prepared according to (A), steel sheets 0.5 mm in thickness which have been pre-treated with zinc phosphate are coated in an electrostatic powder spray installation. The test samples are then heated to 180° C. for 30 minutes and finally to 200° C. for 10 minutes. Films having a thickness of approximately 0.065 mm are obtained.

Elasticity Tests

1. Test of elasticity by Erichsen cupping according to DIN 53; 156:9 mm.
2. Conical mandrel according to ASTM D 522-41:37% (=fault free).
3. Grid section according to DIN 53 151—Apparatus GT C:O (=fault free, optimum).
4. Pencil hardness according to DIN 46 450:3 H.

The knife test produces a tough elastic shaving and confirms the excellent adherence in the grid section test.

The solvent-resistance indicates good chemical cross-linking. The lacquers are resistant to toluene, ethylene glycol acetate and acetone and may be exposed to these solvents for several minutes before the surface begins to soften. The coating does not dissolve; it only swells slightly.

The corrosion-resistance is tested by the salt spray test according to DIN 53,167. In the resistance test, a cut previously applied is resistant to undersurface rusting to a depth of up to 3 mm after 400 hours.

In the detergent resistance test carried out to test the resistance to the conventional household detergents, no faults are detected after more than 40 hours exposure to the test solution at 100° C.

The surface of the films is very evenly levelled and there is no loss of coverage at the edges. The films are homogeneous and free from bubbles.

In this Example, one blocked isocyanate group was used for each free OH group of the polyester in the reaction mixture for the lacquer (100% cross-linking).

Example 7

This Example serves to demonstrate that even those mixtures according to the present invention which contain two OH groups to each masked isocyanate group give rise to excellent elastic lacquer coatings after stoving (50% cross-linking). Preparation and application of the mixtures are carried out by methods analogous to those described in Example 6.

(A) 6.1 parts, by weight, of the masked trimer prepared according to Example 4 are worked-up with 48.1 parts, by weight, of a branched terephthalate polyester of terephthalic acid, neopentyl glycol, hexane diol and trimethylol propane (1.5% OH) to produce a lacquer powder according to the present invention (50% cross-linking: OH:NCO=1:0.5), using the same auxiliary agents and additives as in Example 6 and at the same concentrations.

(B) Technical lacquer properties of the substance mixture described under (A):
1. Elasticity: Erichsen cupping according to DIN 53 156:
   before aging 10 mm
   after aging 10 mm
2. Adherence (Grid section according to DIN 53 151):
   GT O before aging
   GT O after aging
3. Conical mandrel according to ASTM D 522-41: 35% (=fault free)

The solvent-resistance indicates good chemical cross-linking. The lacquer is resistant to toluene, ethylene glycol acetate and acetone and may be exposed to these solvents for several minutes before the surface begins to soften. The coating does not dissolve, but only swells slightly.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A mixture suitable for use as a lacquer powder or as binder for lacquer powder, which mixture is solid and pulverizable at temperatures below about 40° C. and liquid above about 150° C., comprising:
   (a) an isocyanate component having masked isocyanate groups;
   (b) a polyhydroxyl component; and, optionally,
   (c) the conventional auxiliary agents and additives;
characterized in that the compound used as component (a) is a polyisocyanate having isocyanurate groups and isocyanate groups which are masked with lactams and components (a) and (b) are present in quantities corresponding to an equivalent ratio of masked isocyanate groups in the isocyanate component to hydroxyl groups in the polyhydroxyl component of from about 0.4:1 to 2:1.

2. In a process for coating a heat-resistant substrate by known coating methods with a lacquer powder, the improvement comprising coating said substrate with a lacquer powder comprising the mixture of claim 1 or with a lacquer powder containing the mixture of claim 1 as a binder.

3. A pulverulent mixture which is solid and pulverizable at temperatures below about 40° C. and which is liquid at temperatures above 150° C. comprising
   (a) an isocyanate component containing isocyanurate groups and isocyanate groups which are masked with lactams, and
   (b) a polyhydroxyl component
characterized in that components (a) and (b) are present in quantities corresponding to an equivalent ratio of masked isocyanate groups in the isocyanate component to hydroxyl groups in the polyhydroxyl component of from about 0.4:1 to 2:1.

4. The pulverulent mixture of claim 3 wherein the isocyanate component is prepared by heating polyisocyanates or mixtures of polyisocyanates to from about 60° to 150° C. in the presence of a trimerization catalyst in a nitrogen atmosphere to form an isocyanate component having isocyanurate groups and free isocyanate groups which in turn is reacted at temperatures of from about 100° to 200° C. with a stoichiometric quantity of lactams, based on the quantity of free isocyanate groups, to yield an isocyanate component containing isocyanurate groups and isocyanate groups which are masked with lactams.

5. The pulverulent mixture of claim 3 wherein the isocyanate component containing isocyanurate groups has a free isocyanate content prior to masking with lactams of from about 20 to 40% by weight.

6. The pulverulent mixture of claim 3 wherein the lactams correspond to the structural formula

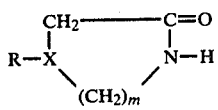

wherein

X represents a CH group, in which case

R represents hydrogen and m represents an integer of from 0 to 9, preferably from 1 to 4; or X represents a nitrogen atom, in which case R represents a straight- or branched-chain $C_1$–$C_4$ alkyl group and m represents 3.

7. The pulverulent mixture of claim 3 wherein the isocyanate component containing isocyanurate groups and isocyanate groups is solid at room temperature and has a melting point above 40° C.

8. The pulverulent mixture of claim 3 wherein the polyhydroxyl component is a polyester having at least two aliphatically bound hydroxyl groups.

9. The pulverulent mixture of claim 8 wherein the polyhydroxyl component is solid at temperatures below about 40° C. and is liquid at temperature above about 150° C.

10. The pulverulent mixture of claims 1 or 3 wherein the equivalent ratio of masked isocyanate groups in the isocyanate component to hydroxyl groups in the polyhydroxyl component is from about 0.5:1 to 1.2:1.

11. The pulverulent mixture of claim 3 wherein additives selected from the group consisting of anti-sticking agents, levelling agents, gloss improvers, heat stabilizers and pigments are present.

12. The pulverulent mixture of claim 3 wherein the isocyanate component and the polyhydroxyl component are mixed in a liquid state at a temperature too low for cross-linking.

13. The pulverulent mixture of claim 12 wherein the isocyanate component and the polyhydroxyl component are mixed at a temperature from about 100° to 150° C.

14. The pulverulent mixture of claim 3 wherein the particle size of said pulverulent mixture is from about 0.01 to 0.05 mm.

15. In a process for coating a heat-resistant substrate with a lacquer powder, the improvement comprising coating said substrate with a lacquer powder comprising the pulverulent mixture of claim 3 or with a lacquer powder containing the pulverulent mixture of claim 3 as a binder.

* * * * *